(12) United States Patent
Money (10) Patent No.: US 6,713,909 B2
(45) Date of Patent: Mar. 30, 2004

(54) DIGITALLY CONTROLLED VARIABLE SPEED INTEGRATED PLANER MOTOR ASSEMBLY

(76) Inventor: James Bryant Money, 1360 Santa Inez Dr., San Jose, CA (US) 95125

( * ) Notice: Subject to any disclaimer, the term of this patent is extended or adjusted under 35 U.S.C. 154(b) by 233 days.

(21) Appl. No.: 09/932,684

(22) Filed: Aug. 20, 2001

(65) Prior Publication Data

US 2003/0042800 A1 Mar. 6, 2003

(51) Int. Cl.[7] .......................... H02K 21/24; H02K 3/26
(52) U.S. Cl. .................. 310/68 B; 310/156.32; 310/DIG. 6; 310/90
(58) Field of Search .................. 310/156.32–37, 310/68 B, 68 R, 269, 90

(56) References Cited

U.S. PATENT DOCUMENTS

| | | | | |
|---|---|---|---|---|
| 3,867,656 A | * | 2/1975 | Mitsui et al. ................. | 310/68 |
| 5,619,085 A | * | 4/1997 | Shramo ....................... | 310/184 |
| 5,982,069 A | * | 11/1999 | Rao ............................. | 310/208 |
| 6,417,587 B1 | * | 7/2002 | Komatsu et al. ........... | 310/68 B |

* cited by examiner

*Primary Examiner*—Karl Tamai

(57) ABSTRACT

The integrated planer motor assembly consists of two parts:
  a. A integrated planer stator assembly that combines the motors stator coils, biased MR sensors and the motor's variable speed control IC into a single part using advanced high volume semi-conductor manufacturing processes;
  b. A planer rotor assembly having a precise planer surface containing the high energy permanent magnet and the ceramic ferrite return structure.

The rotor assembly is assembled to the stator assembly using a precision washer to establish the motors small and precise air gap thus maximizing magnetic flux density.

1 Claim, 11 Drawing Sheets

Figure 1

Base Substrate 30

DIGITALLY CONTROLLED VARIABLE SPEED INTEGRATED PLANER MOTOR ASSEMBLY

BACKGROUND

1. Field of Invention

This invention relates to a variable speed integrated motor assembly for use in applications where precise and variable speed capability is essential.

2. Description of Prior Art

DC motors made their introduction into disk drives in the early 1980's replacing the more larger and complex AC motors and controllers with a smaller, lower power, and more cost-effective assembly. Stator coils are hand or machine wound and then arranged in a circumferential pattern around the rotors permanent magnets. To sense rotor position during operation, multiple Hall probe type sensors, were placed in the stator assembly, that sense the magnetic field intensity in the motors air gap. To eliminate the cost of the Hall probes a sensor-less type control was implemented using the back EMF generated by the coils to determine motor speed. The output of either the Hall probes or the back EMF is used by complex external control circuits that applies current to the stator coils to regulate motor speed and direction.

This multi-part design is complex, expensive and requires several vendors to implement the design, i.e., wound stator coils, Hall probe sensors and the electronic control circuit usually implemented as an integrated circuit (IC). This leads to complex packaging solutions, that are specific to the application, and involves extensive cabling and interconnections. In addition, the design and implementation is not easily extended to the markets requiring multi-speed operation.

OBJECTS AND ADVANTAGES

Accordingly, several objects and advantages of my invention are:

- To provide a parallel rotor-stator assembly, separated by a small and precise air gap, thus increasing the magnetic flux density (and Torque) in the air gap.
- To provide an integrated stator assembly that includes the stator coils, magnetic field sensors and control electronics IC.
- To provide a permanent magnet rotor assembly with a low reluctance magnetic return.
- To provide a variable speed motor that can change speeds rapidly on command from a host system.

Further objects and advantages of my invention will become apparent from a consideration of the drawings and ensuing description.

SUMMARY

In accordance with the present invention a variable speed integrated planer motor assembly having a planer stator assembly containing spiral coils, biased MR sensors, interconnect conductor patterns and a digital microcontroller IC. The motor's stator assembly is manufactured by a high-volume semiconductor process with high yields and reproducibility.

Description—FIGS. 1 to 8

Rotor Assembly 5

Figure 1:
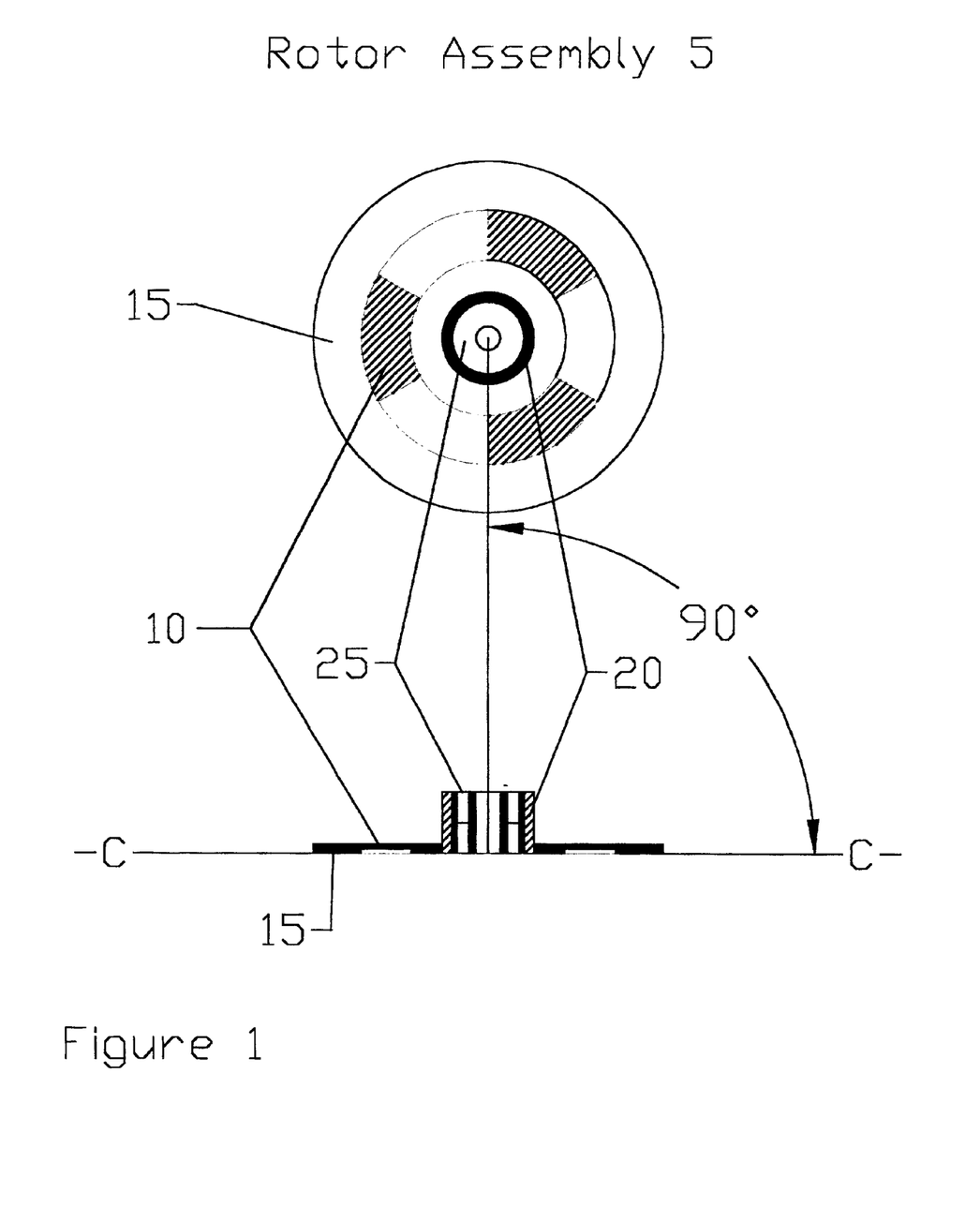
FIG. 1 shows the Motors Rotor Assembly.

FIG. 1 shows the front and top view of the motors rotor assembly 5 and is fabricated according to the following methods and processes.

1. A thin walled bearing sleeve of conductive Zirconia, $ZrO_2$, 20 is bonded to a hot pressed, high saturation magnetization, nickel-zinc ferrite disk, 15 perpendicular and coplanar to datum C—C.
2. A high-energy permanent magnet 10, of anisotropic sintered neodymium-iron-boron, is bonded to ferrite disk 15 and extends beyond the face of the ferrite disk 15 by approximately 0.001 inches or less.
3. The assembly is now lapped (or ground) to establish the final datum C—C perpendicular to the ID diameter of bearing sleeve 20. Datum C—C to be flat to within 0.0001 inches or better.
4. Bearings 25 are assembled into the thin walled ceramic sleeve 20, with an UV curable adhesive, so that the bearing races are coplanar with datum C—C and the bearings ID bore is perpendicular to datum C—C.
5. The face of the assembly is now coated with a thin (1 micron) layer of aluminum oxide, $Al^2O^3$, by a sputtering process to create a protective barrier for the permanent magnet and ferrite disk.
6. The assembly is now magnetized perpendicular to the permanent magnets face (datum C—C) with alternating segments of opposite polarity.

The bearing sleeve is injection molded from a conductive Zirconia ($ZrO_2$) material and is available in high volume from Kyocera Ceramics as well as other manufactures. A typical specification for the material in the preferred embodiment is:

| | |
|---|---|
| Density: | 6.00 (grams/cm3) |
| Flexural Strength | 980 (MPa) |
| Young's Modulus | 206 (MPa) |
| Thermal Conductivity | 6 (W/m*K) |
| Coefficient of Linear Expansion | 10.5 (ppm/° C.) |
| Porosity | none |

The ferrite disk 15 is a hot pressed nickel-zinc ferrite, having an approximate saturation magnetization of 5,000 gauss acts as a low reluctance magnetic return in the final motor assembly. It was precision molded, and double sided lapped to precise specifications.

Stator Assembly 70

Figure 2:
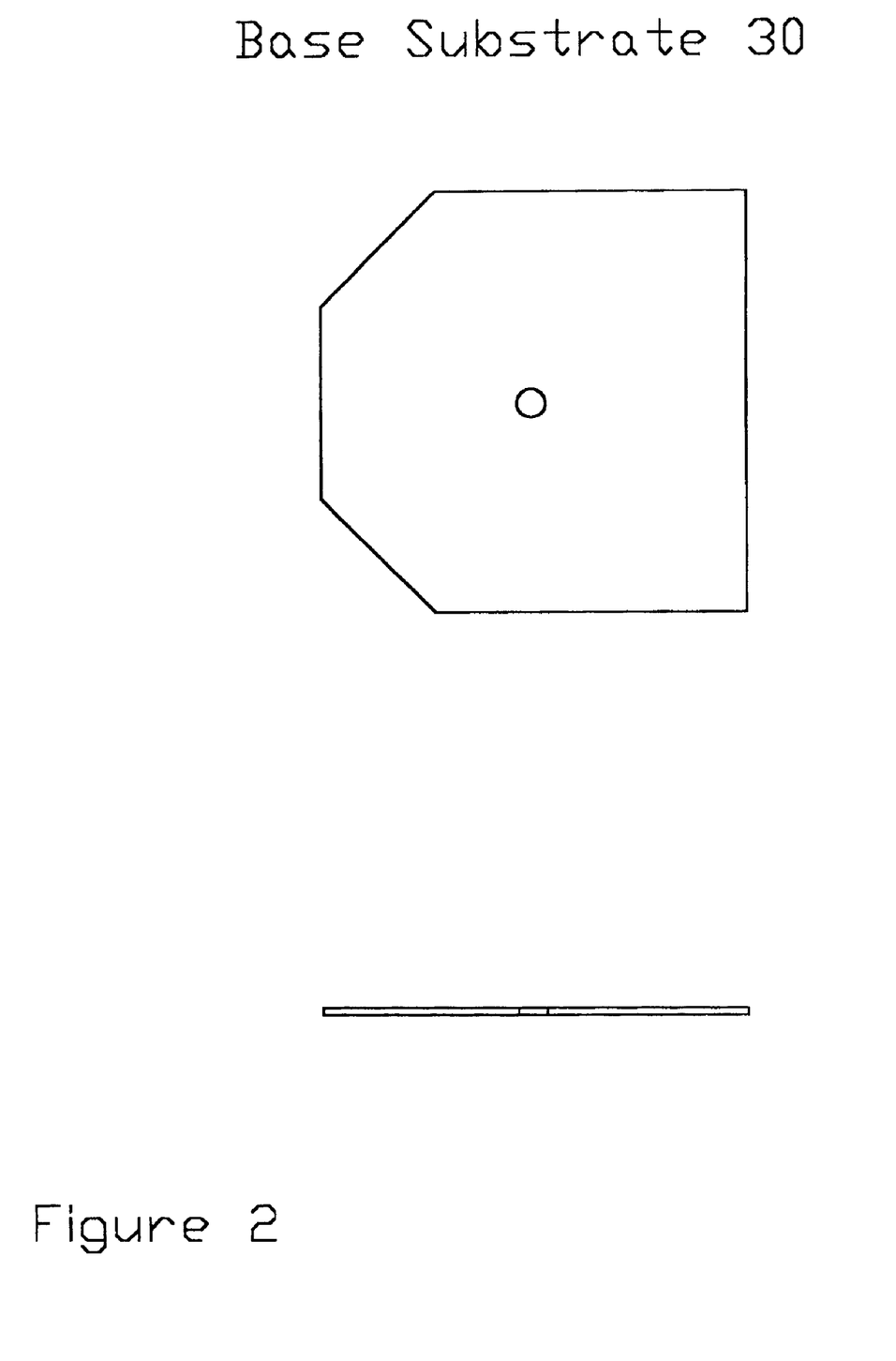
FIG. 2 shows the base substrate used to fabricate the stator assembly.

FIG. 2 shows the base substrate 30 upon which the stator assembly will be fabricated using semiconductor processes and methods. The base substrate 30 material is nickel-zinc ferrite, the same material as disk 15 of the rotor assemble, which also acts as a low reluctance magnetic return in the motors magnetic circuit. The base substrate 30 was manufactured by a hot pressed molding process ground and lapped to a precise thickness, flatness and surface finish specification.

Figure 3:
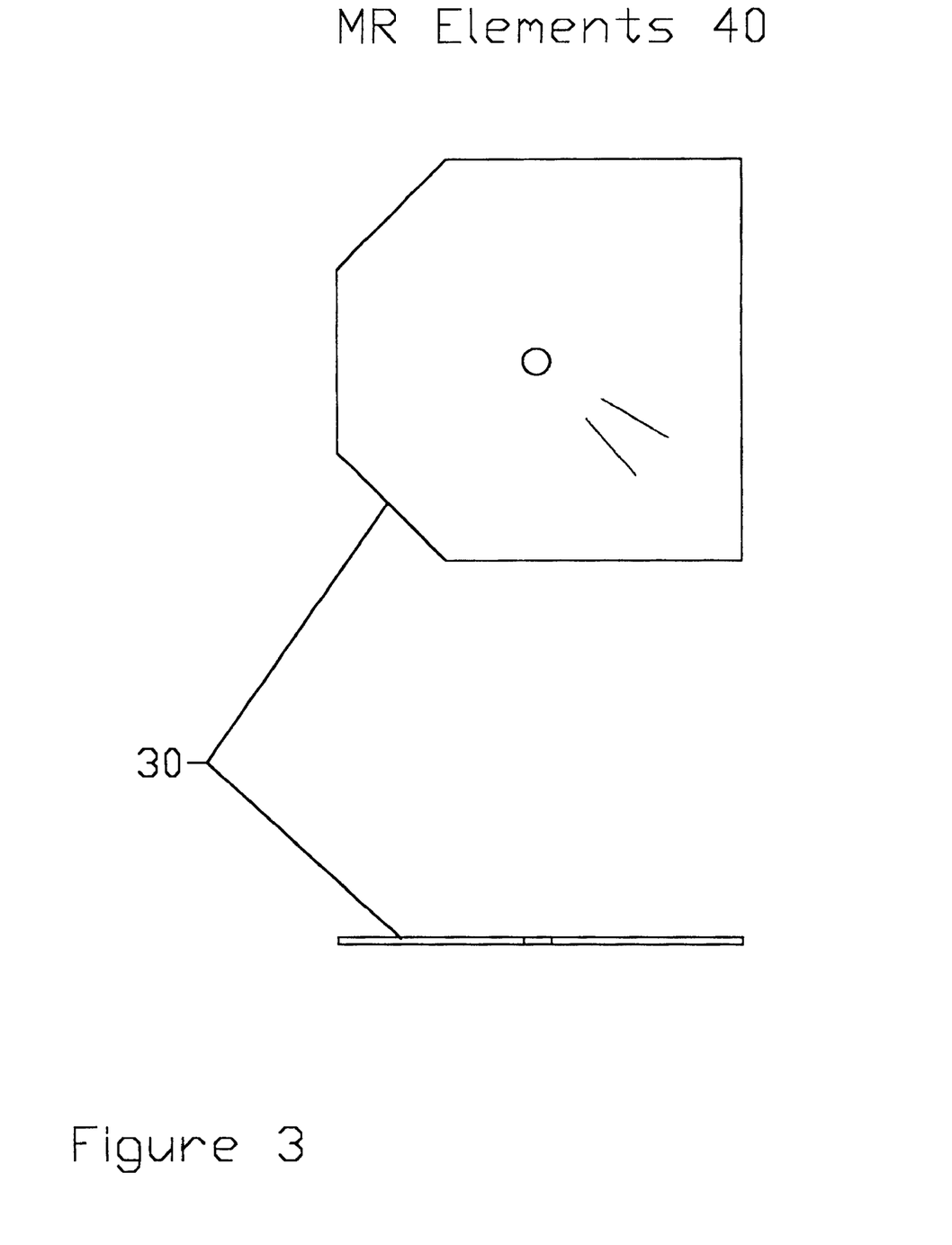
FIG. 3 shows the biased magnetoresistive (MR) elements of the stator assembly.

FIG. 3 shows the biased magnetoresistive (MR) elements 40 that detect magnetic intensity and polarity in the motors air gap to provide electronic signals that will be used to control the motors speed and direction. The MR elements can be fabricated with the following materials and processes.

1. Sputter deposit a thin film of copper (Cu) onto the surface of base substrate 30 followed by a film of equal thickness of 80/20 nickel-iron (Ni—Fe).
2. Apply approximately 1 micron of photoresist.
3. Expose with MR mask.
4. Develop photoresist and postbake.
5. Ion Mill to remove Copper and nickel-iron
6. Strip photoresist and clean.

The copper layer provides the magnetic bias to the adjacent magnetoresistive nickel-iron film and each film thickness is selected to get the desired resistances and amount of Magnetic bias. This general design was used effectively by IBM to fabricate the multi-channel magnetic heads on its 3340 tape storage sub-system.

Figure 4:
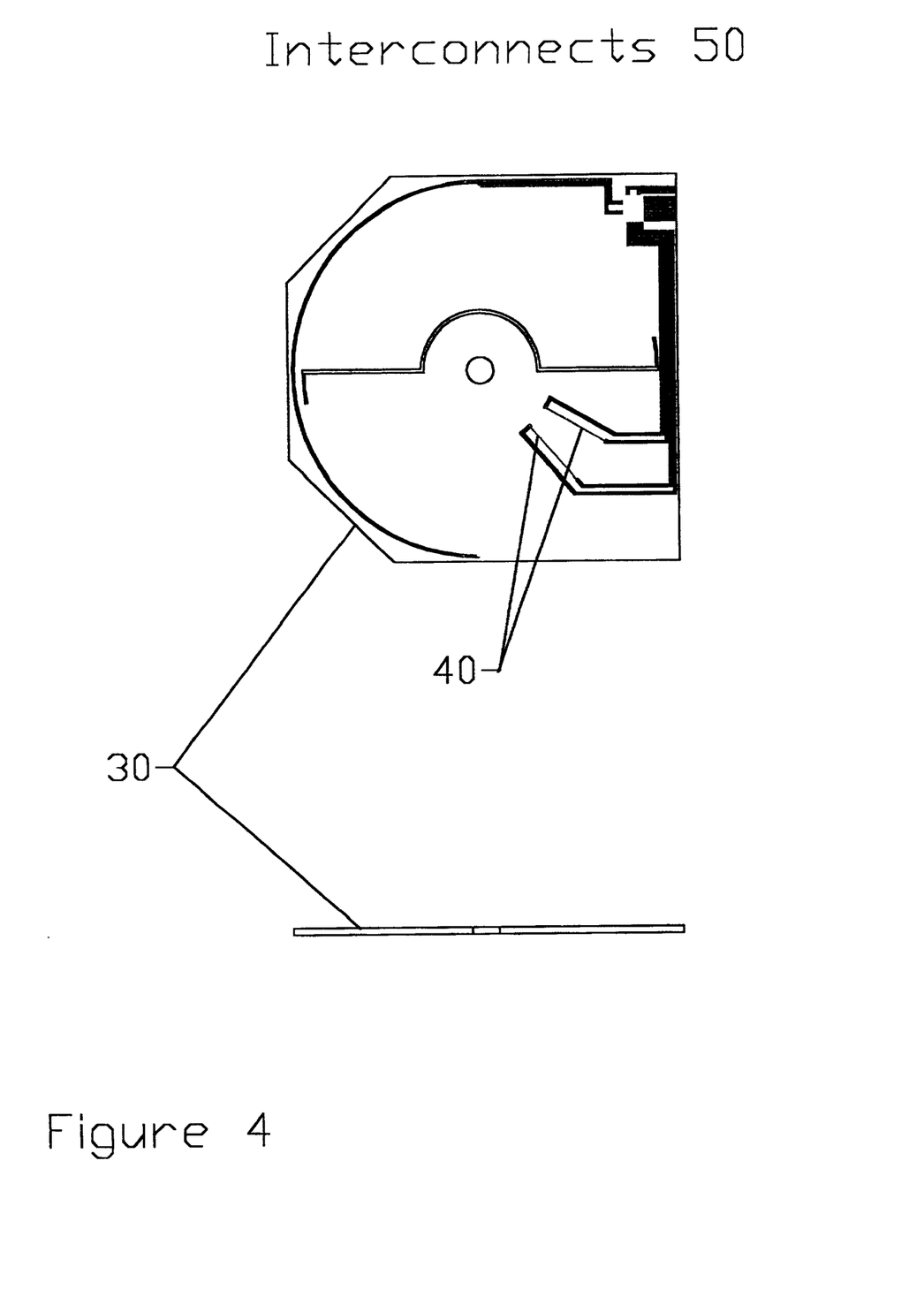
FIG. 4 shows the interconnect pattern of the stator assembly.

FIG. 4 shows the copper interconnect pattern 50, which can be fabricated with the following materials and processes.

Figure 5:
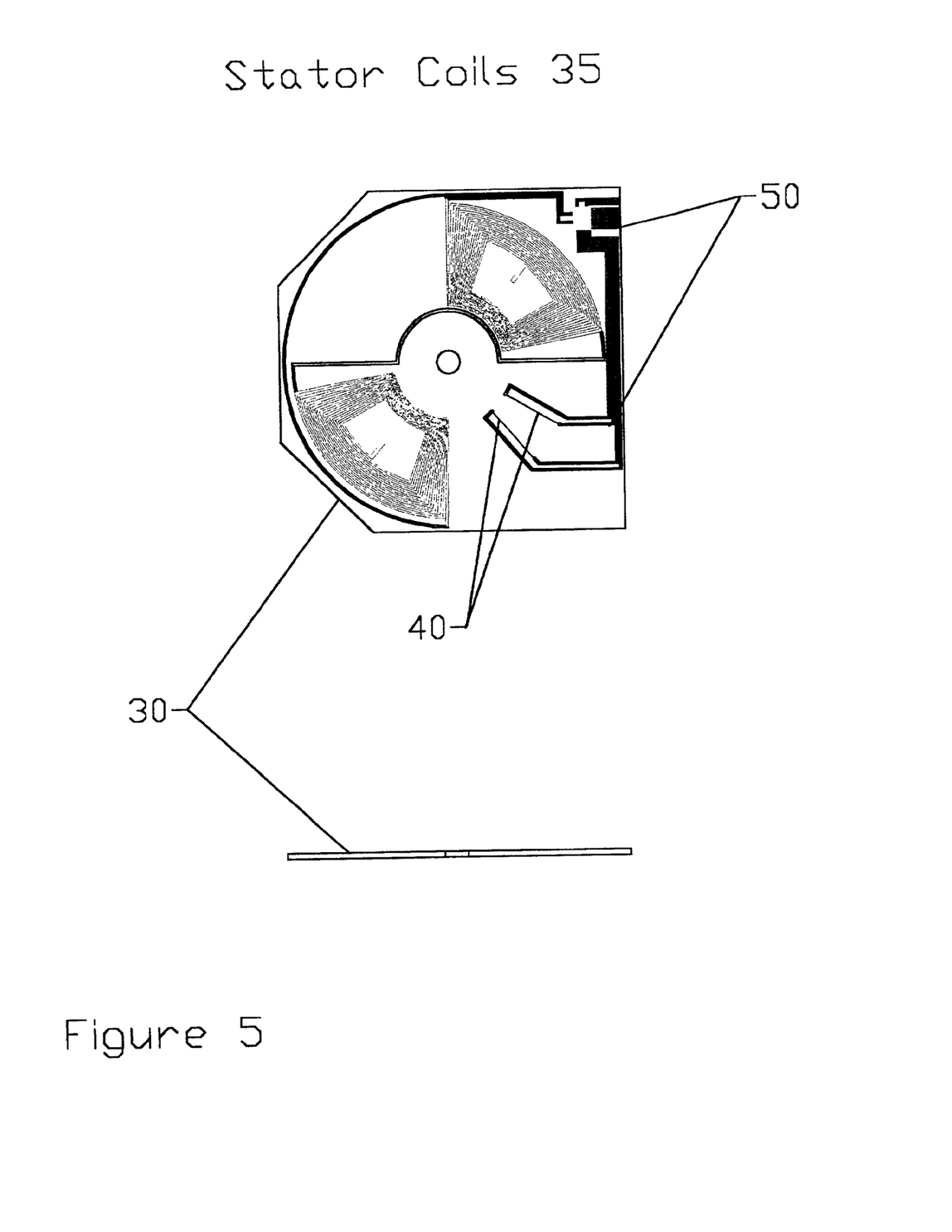
FIG. 5 shows the stator coils of the stator assembly.

1. Sputter deposit 1,000 Angstroms of copper (Cu) onto the base substrate 30 as a seed layer
2. Apply approximately 15–20 microns of photoresist.
3. Expose with Interconnect mask.
4. Develop photoresist and postbake.
5. Electroplate copper to the thickness of the photoresist.
6. Strip photoresist and clean.
7. Ion mill or sputter etch to remove seed layer FIG. 5 shows the spiral stator coils 35 used to provide controlled torque to the rotor. The Inward radial spokes start a 0° and end at 20° and the outward radial spokes start at 60° and end at 80°. Inward radial spokes are connected to outward radial spokes by hub conductors and outward radial spokes connected to inward radial spokes by rim conductors. The spiral conductors as shown in FIG. 5 has N turns. The spiral coils 35 can be fabricated with the following materials and processes.

1. Sputter deposit 1,000 Angstroms of copper onto the base substrate 30 as a seed layer
2. Apply 125 microns of photoresist
3. Expose with spiral coil mask.
4. Develop photoresist and postbake.
5. Electroplate copper to a thickness of 125 microns.
6. Strip photoresist and clean
7. Ion mill or sputter etch to remove seed lay A stator coil develops torque according to the following relationship:

$$T = R*Lc*B*I = R*C*N*B*V/R$$

Where
T=Torque (N–m)
R=mean radius of permanent magnet (m)
Lc=Length of conductors (m)=C*N
B=Magnetic field Intensity (Tesla)
I=Current (amps)=V/R
N=Number of turns
C=constant
V=Supply Voltage (volts)
R=stator coil resistance (ohms)

Recent advances in UV lithography, thick photoresist, and electroplating make possible thick conductors (greater than 100 microns), narrow width, high edge steepness (>88°) and aspect ratios of up to 10:1. This means for a 125 micron thick conductor its width can be of the order of 12.7 microns with spaces between conductors of 12.7 microns thus maximizing N and minimizing R for the spiral coil. This allows the motor to be driven from as low as a 3.3-volt supply with excellent performance and power dissipation.

Figure 6:
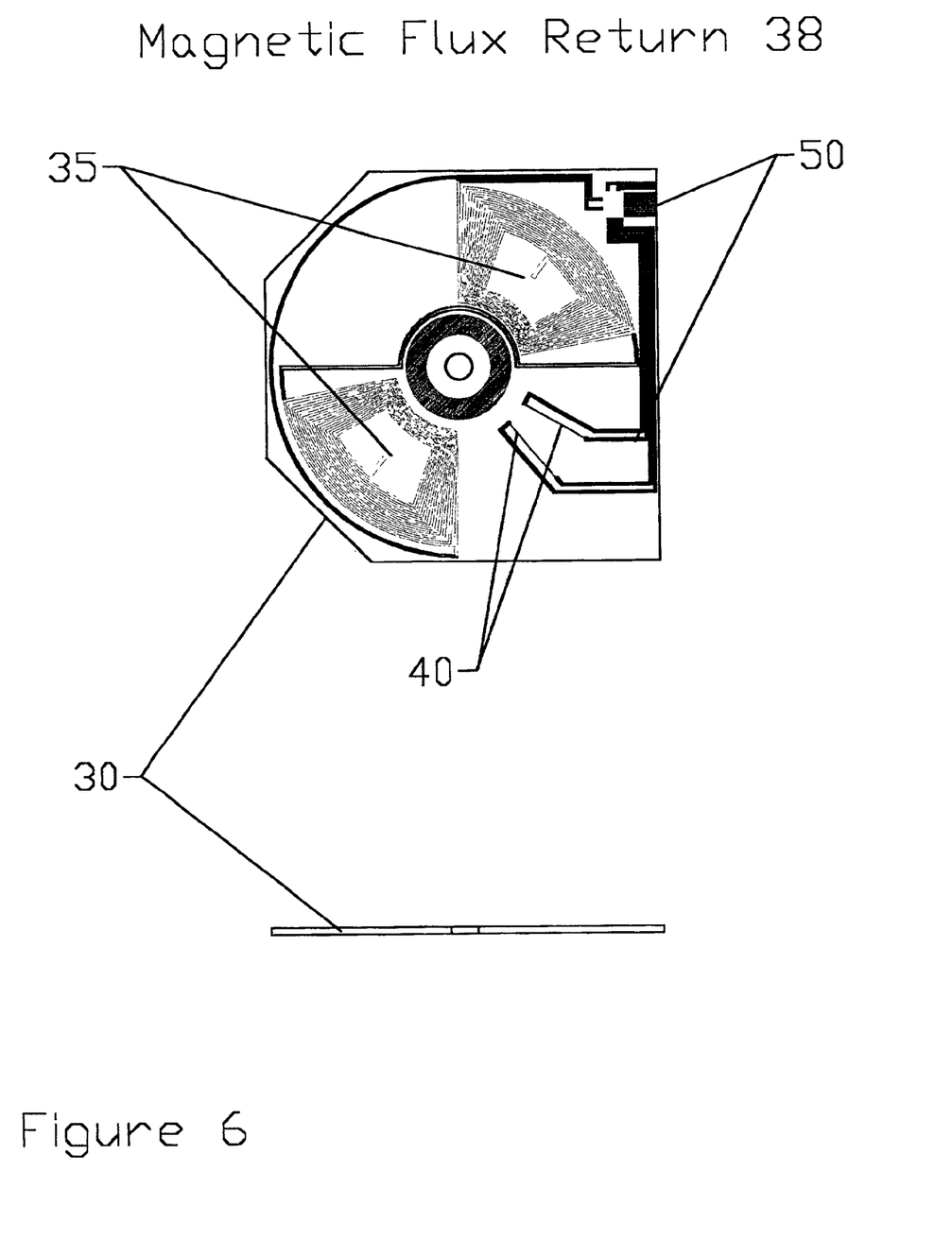
FIG. 6 shows the magnetic flux return pattern of the stator assembly.

FIG. 6 shows the magnetic flux return 38 of the stator assembly. It's purpose is the minimize the reluctance of the magnetic flux circuit so as to maximize flux density circulating in the motors air gap thus maximizing the motors torque. It can be fabricated as follows.

1. Sputter deposit 1,000 Angstroms of nickel-iron (Ni—Fe) having an iron content between 50–55 percent onto the base substrate 30.
2. Apply photoresist to a thickness of 125 microns
3. Expose with magnetic flux return mask.
4. Develop photoresist and postbake.
5. Electroplate Ni—Fe with an iron content between 50–55 percent.
6. Strip photoresist and clean.
7. Ion Mill or sputter etch to remove seed layer.

A protective coating of a photoresist is applied over the surface of the substrate 30 to level and provide support to the 3-D structures.

1. Apply photoresist
2. Expose with overcoat mask with IC contacts via's
3. Develop photoresist and postbake.
4. Hard-bake photoresist
5. Apply solder, into via's, with silkscreen solder mask.

Figure 7:
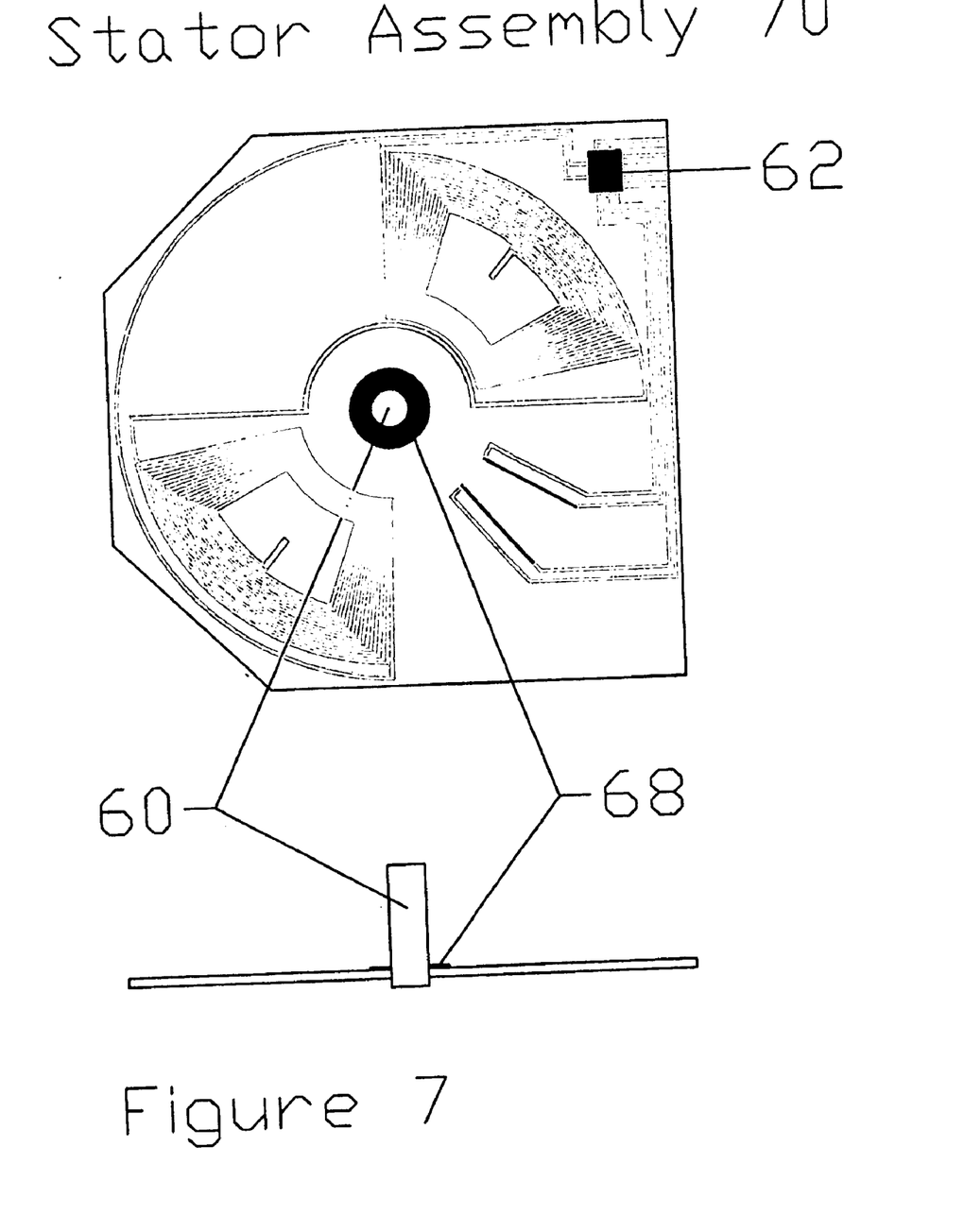
FIG. 7 is the completed stator assembly with control IC and motor shaft attached

FIG. 7 shows the completed Stator assembly 70. A Zirconia shaft 60 and precision spacer 68 has been bonded to the Base Substrate 30 using a high strength UV curable adhesive. The motor control IC bumped die has been attached to interconnect pattern 50 by a solder re-flow process.

Figure 8:
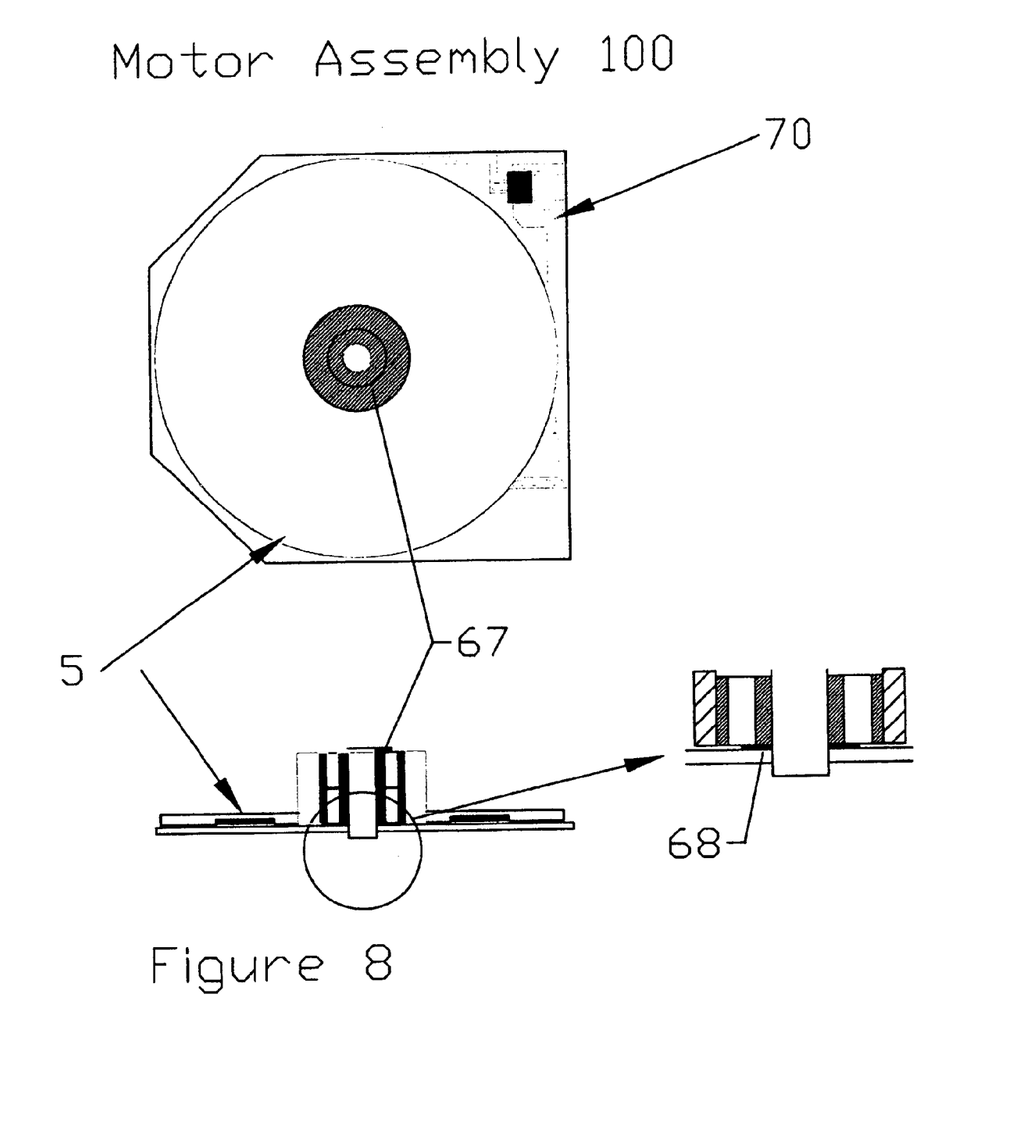
FIG. 8 is the completed planer motor assembly.

FIG. 8 is the completed motor assembly 100 and is assembled as follows:

Precision spacer 68, and has a thickness of:

$$t_s = t + l_g$$

where
$t_s$=thickness of precision spacer 68 (m)
t=thickness from base substrate 30 to top of protective coating (m)
lg=desired length of air gap (m)

Rotor assembly 5 is now assembled onto shaft 60 and secured by washer 67. Washer 67 is bonded to shaft 60, while maintaining proper bearing pre-load, with an UV curable adhesive.

Figure 9:
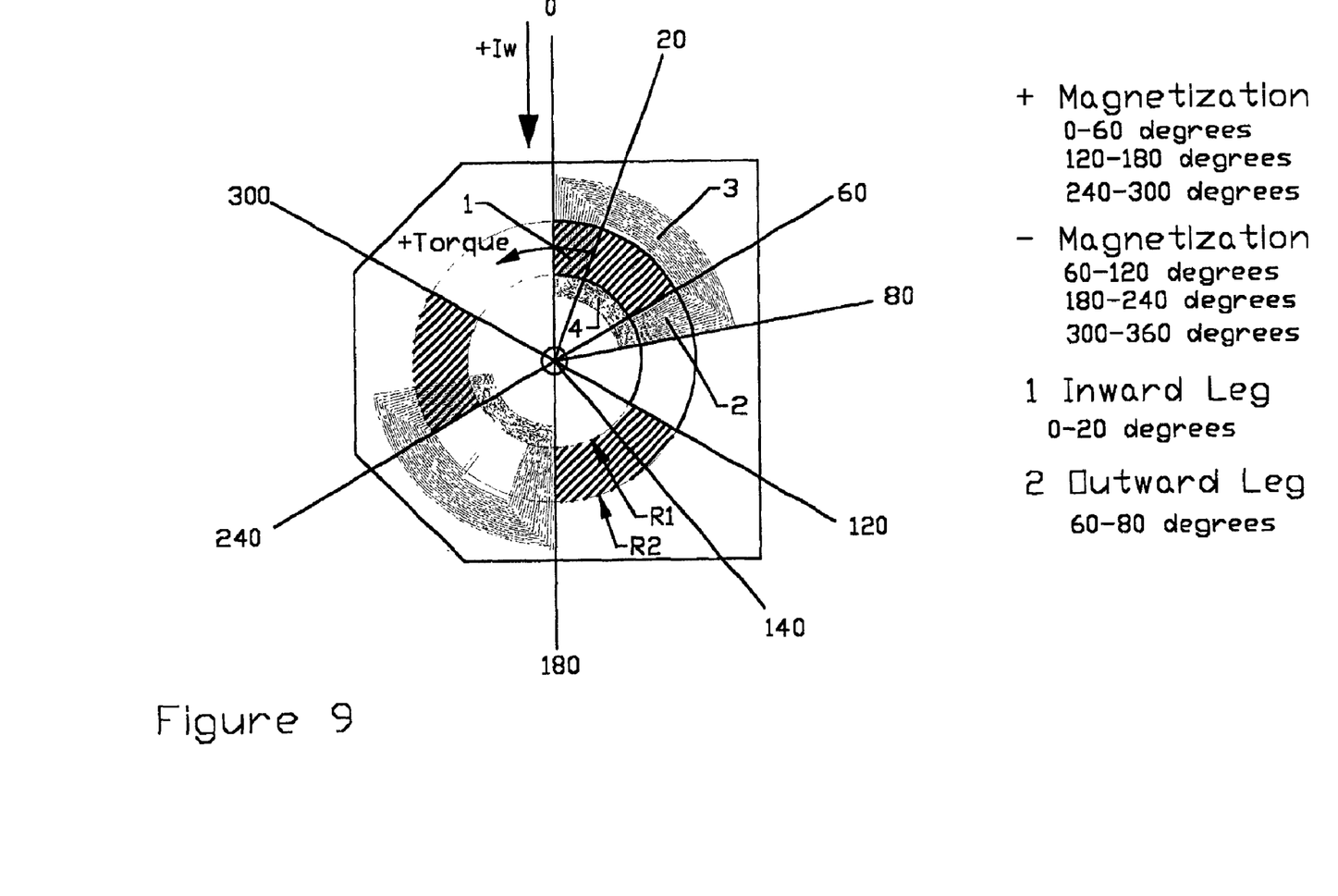
FIG. 9 shows the relationship between torque, current, the stator coils and the rotor's high-energy permanent magnet.
Figure 10:
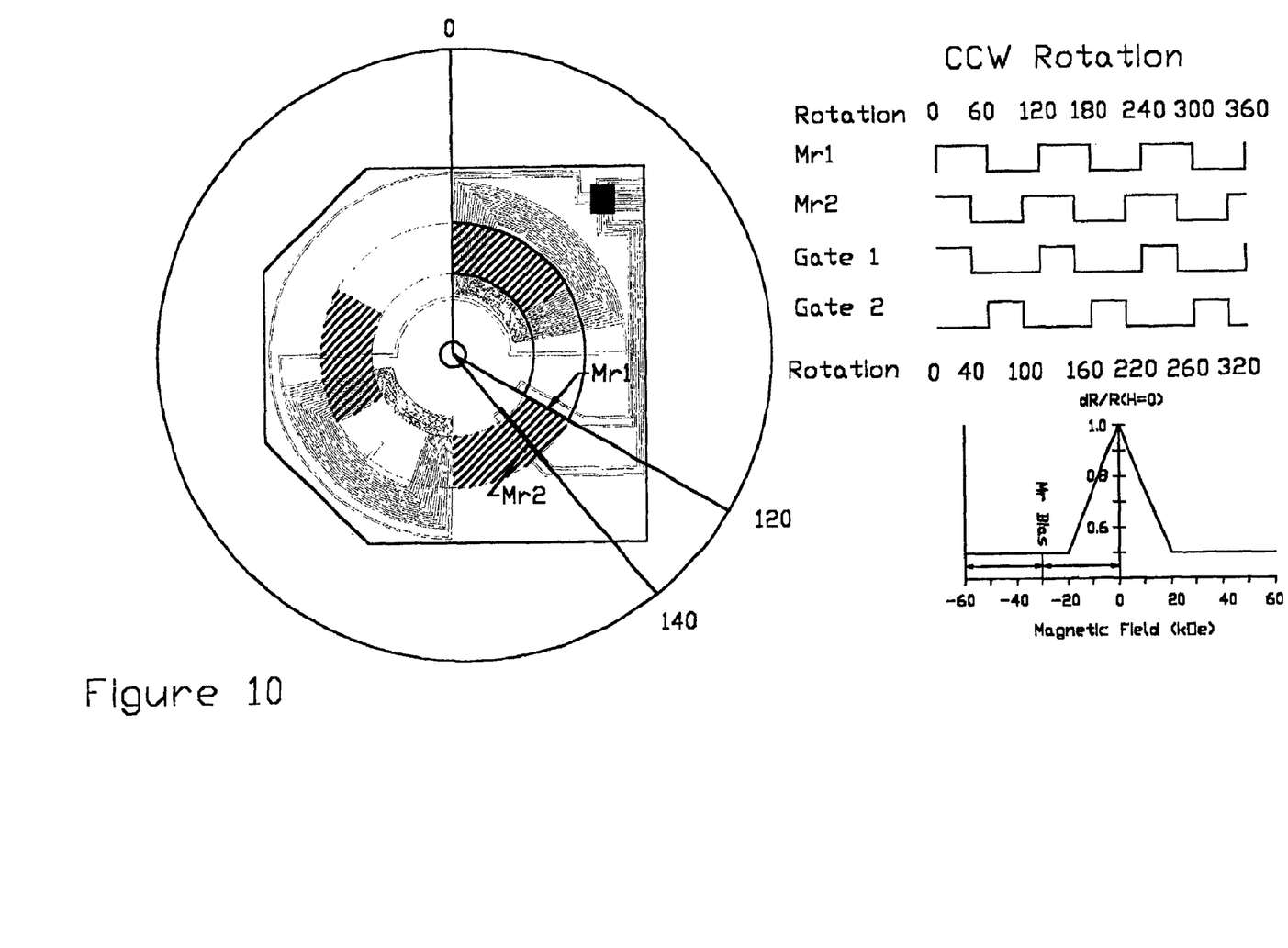
FIG. 10 shows the relationship between the stators biased MR elements, the stator coils and the rotors high-energy permanent magnet.
Figure 11:
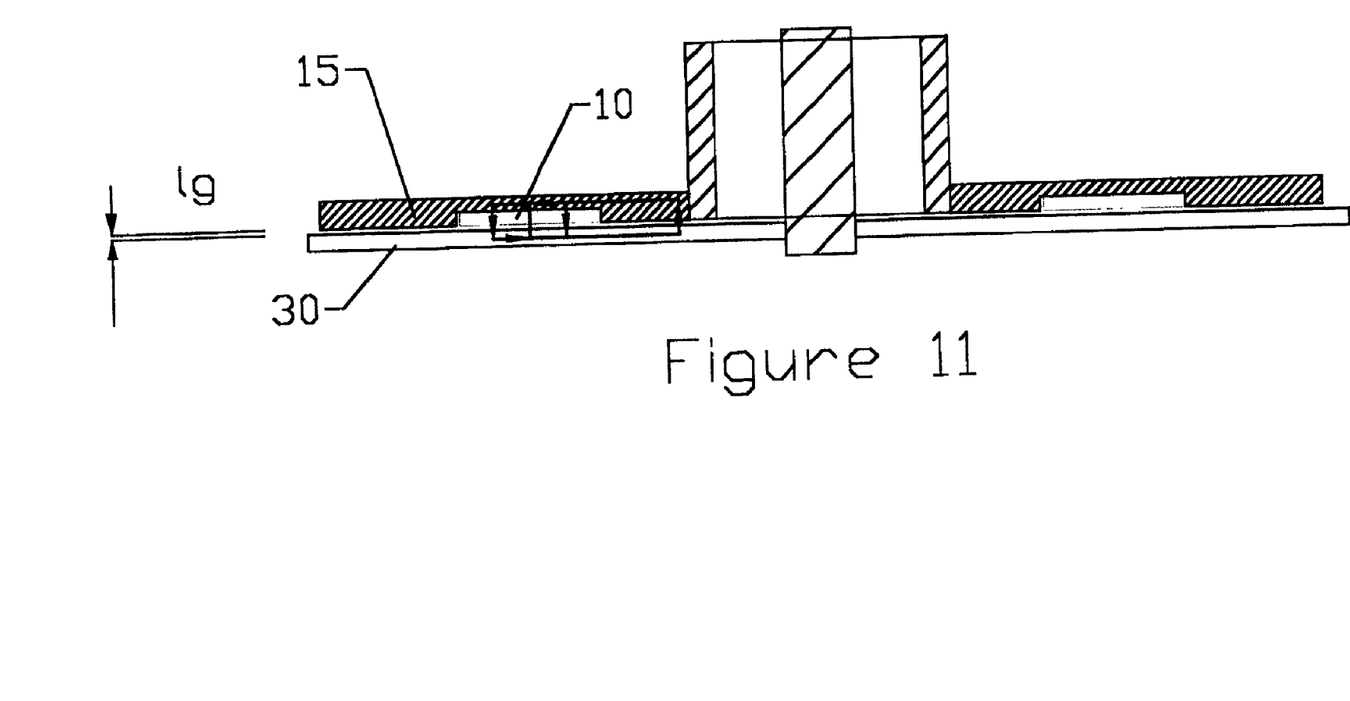
FIG. 11 is a cross section of the assembled rotor and the stator assembly.

Operation—FIGS. 9 to 11

The relationship between torque, the magnetization of the permanent magnet 10, and the stator coils are shown in FIG. 9. Salient features are;

1. In the preferred embodiment, Spiral coil 1 has inward radial conductors lying between 0° and 20°, outward radial conductors lying between 60° and 80°. Spiral coil 2 has inward radial conductors lying between 240° and 260°, outward radial conductors lying between 180° and 200°. Inward to outward radial conductors are connected by hub circular conductors having radius's less than R1 and outward to inward radial conductors are connected by rim circular conductors having radius's greater than R2. The coil terminates midway on the last rim conductor and then is connected to the start of the inward conductors of coil 2. Each coil contains N turns. Therefore the length of conductors, within the magnetic field having magnetic intensity B, is;

$$Lc=4*N*(R2-R1)$$

2. The permanent magnet has been magnetized into 3 segments according to the following table.

| Angle-degrees | 0–60 | 60–120 | 120–180 | 180–240 | 240–300 | 300–360 |
|---|---|---|---|---|---|---|
| Magnetization Tesla | +B | −B | +B | −B | +B | −B |

3. The torque generated by the coils and applied to the rotor is;

$$T=Rm*B*Lc*I$$

T=Torque (newton-meters)

$R_m$=R1+((R2−R1))/2) (meters)

B Flux Density in Air Gap (tesla)

$$T=((R2-R1)/2+R1)*(4*N*(R2-R1))*B*I$$

4. IC 66 supplies a positive voltage, +V, to the start of coil 1, a positive current, I+, flows through both coils and this creates a positive torque, T+, applied to the rotor and when the current is reversed, −I, the torque is reversed. The amount of voltage supplied by IC 66 to the coils is controlled by a 14-bit DAC.

FIG. 10 shows the relationship between the biased MR elements 40, the stator coils 35 and the permanent magnet 10.

1. The MR elements are biased to −B shown in FIG. 10. MR1 is 120° from the leading edge of the inward conductors of coil 1 and MR2 is 20° from MR1.
2. The output of the MR elements reflects the polarity of the magnetic field in the air gap. When the magnetic field intensity B is equal and opposite to the MR bias, the output of the MR elements will go high. When the magnetic field intensity B is the same as the MR bias, the output will remain low. The waveforms Mr1 and Mr2 are shown in FIG. 10 as a function of rotor rotation.
3. Gate 1 is high when Mr1 and Mr2 are high and Gate 2 is high when Mr1 is low and Mr2 is high. The waveforms Gate 1 and Gate 2 are shown in FIG. 10 shows as a function of rotor rotation.
4. The current-torque relationship is;

| Gate | Current I | Torque |
|---|---|---|
| 1 | Positive | Positive |
| 1 | Negative | Negative |
| 2 | Negative | Positive |
| 2 | Positive | Negative |

5. Comparing the actual time of a Mr1 cycle, Ta, with the desired time, Td, generates a digital error signal.

Error=$e=Td-Ta$

6. Current is then supplied to the coil proportional to the magnitude and sign of the error.

Torque=$f$(magnitude and sign of the error)

7. The system operates in a linear mode with current to the coil varying from 0 to Imax in $2^{14}$ increments.

FIG. 11 shows the magnetic flux circulation in the rotor-stator assemblies. To calculate the flux density Bg in the air gap we assume that there is no magnetic potential drop across the ferrite returns 15, 30, and 38. Therefore, the magnetic potential, produced by the permanent magnets, diminishes solely across these air gap, i.e., Hmlm=Hglg and the magnitude of the flux density in the air gap can be estimated by:

$$Bg=(lm/(lg)\times Hm$$

Where
lm=length of magnet (meters)
lg=length of air gap (meters)
Bg=Magnetic Flux Density (tesla)

The length of the air gap, lg, is the thickness of the precision spacer 68 and is nominally 175 microns. For a magnet thickness 10 of 525 microns this gives a load line, lm/lg, of 3. Using some published demagnetizing curves for anisotropic sintered neodymium-iron-boron, and the load line of 3.0, gives a $B_g$ in excess of 1.10 tesla in the air gap.

CONCLUSIONS, RAMIFICATIONS, AND SCOPE

Accordingly, the reader will see that the Variable Speed Integrated Planer Motor Assembly of this invention, has shown and demonstrated;

A integrated planer stator assembly that combines the motors stator coils, biased MR sensors and the control IC into a single part using existing high volume semiconductor manufacturing processes;

A simple but precise parallel rotor-stator assembly having a uniform and small air gap that maximizes the magnetic flux density in the air gap.

Rotor and stator assemblies with low reluctance magnetic returns.

Precise and variable speed operation up to 20,000 RPM.

Thick spiral stator coil conductors for maximum number of turns and low resistance.

Biased MR sense elements precisely located relative to the spiral stator coils.

An automated and precise assembly of the rotor assembly to the stator assembly using a precision spacer to establish the motor air gap.

A simple and precise speed control digital IC that interfaces, on a serial bus, to a host system that controls the motors speed and direction.

While my above description contains many specifications, these should not be construed as limitations on the scope of the invention, but rather as an exemplification of one preferred embodiment thereof. Many other variations are possible. For example the stator assembly can be made on substrates on different materials and shapes, use other semiconductor processes, use different MR materials, use other control logic and IC's, etc; the rotor assembly can be made with different permanent magnets and the air gap set in other ways than a precision spacer, etc.

Accordingly, the scope of the invention should be determined not by the embodiments illustrated, but by the appended claims and their legal equivalents.

What is claimed is:

1. A variable speed integrated planer motor assembly comprising:

an integrated stator assembly including a ceramic ferrite substrate having a plurality of spiral conductor stator coils, a plurality of biased magnetoresistive elements, a conductor interconnect pattern for IC and flex cable attachment;

a rotor assembly including a ceramic ferrite disk having a permanent magnet assembled on a ceramic bearing sleeve;

a shaft;

a spacer;

said rotor assembly assembled to said integrated stator assembly on said shaft with said spacer;

a digital microcontroller IC providing variable speed control.

* * * * *